(12) United States Patent  
Asghari et al.

(10) Patent No.: US 11,370,303 B2  
(45) Date of Patent: Jun. 28, 2022

(54) METHOD AND SYSTEM FOR ALERTING A TRUCK DRIVER

(71) Applicant: DAF Trucks N.V., Eindhoven (NL)

(72) Inventors: Kurosch Hossein Asghari, Eindhoven (NL); Johannes Jacobus Maria Van Rozendaal, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 142 days.

(21) Appl. No.: 16/756,527

(22) PCT Filed: Oct. 19, 2018

(86) PCT No.: PCT/NL2018/050689  
§ 371 (c)(1),  
(2) Date: Apr. 16, 2020

(87) PCT Pub. No.: WO2019/078721  
PCT Pub. Date: Apr. 25, 2019

(65) Prior Publication Data  
US 2020/0290457 A1    Sep. 17, 2020

(30) Foreign Application Priority Data  
Oct. 20, 2017   (NL) .................................. 2019774

(51) Int. Cl.  
*B60K 35/00* (2006.01)  
*G02B 27/01* (2006.01)  
*G02B 27/14* (2006.01)

(52) U.S. Cl.  
CPC .......... *B60K 35/00* (2013.01); *G02B 27/0101* (2013.01); *G02B 27/143* (2013.01);  
(Continued)

(58) Field of Classification Search  
CPC ............ B60K 35/00; B60K 2370/1529; B60K 2370/178; B60K 2370/785;  
(Continued)

(56) References Cited

U.S. PATENT DOCUMENTS

2005/0154505 A1* 7/2005 Nakamura ............. G02B 27/01  
701/1  
2012/0169513 A1 7/2012 Szczerba et al.  
(Continued)

FOREIGN PATENT DOCUMENTS

| DE | 102014015378 A1 | 4/2016 |
|---|---|---|
| WO | 03016983 A1 | 2/2003 |
| WO | 2016014712 A1 | 1/2016 |

OTHER PUBLICATIONS

Jan. 30, 2019, International Search Report and Written Opinion, PCT/NL2018/050689.

*Primary Examiner* — Brent D Castiaux  
(74) *Attorney, Agent, or Firm* — Banner & Witcoff, Ltd.

(57) ABSTRACT

It is aimed to provide a projection system for projecting signal data on a windscreen or side screens of a motor vehicle cabin. The system comprises a light source arranged for emitting a beam and a housing, to be configured at an elevated position in the cabin. The housing comprising a digital mirror device, the digital mirror device arranged pattern the beam of the light source to project an image on at least a front and side window portion of the cabin. Part of the housing is shaped with a reflective surface that is optically inverse to the cabin window geometry, so that, when the digital mirror device projects a single image on the optical surface, it is imaged on the windscreen and at least one of side windows.

4 Claims, 5 Drawing Sheets

(52) U.S. Cl.
CPC ..... *B60K 2370/1529* (2019.05); *B60K 2370/178* (2019.05); *B60K 2370/785* (2019.05); *G02B 2027/011* (2013.01); *G02B 2027/014* (2013.01)

(58) Field of Classification Search
CPC .............. G02B 27/0101; G02B 27/143; G02B 2027/011; G02B 2027/014; G02B 5/09; G02B 5/10; G02B 26/0841
See application file for complete search history.

(56) References Cited

U.S. PATENT DOCUMENTS

2014/0168608 A1\* 6/2014 Disley .................... G03B 21/56
 352/132
2015/0274178 A1\* 10/2015 Tsuyunashi ........... B60W 30/09
 701/36

\* cited by examiner

METHOD AND SYSTEM FOR ALERTING A TRUCK DRIVER

CROSS-REFERENCE TO RELATED APPLICATIONS

This application is a U.S. National Stage application under 35 U.S.C. § 371 of International Application PCT/NL2018/050689 (published as WO 2019/078721 A1), filed Oct. 19, 2018, which claims the benefit of priority to Application NL 2019774, filed Oct. 20, 2017. Benefit of the filing date of these prior applications is hereby claimed. Each of these prior applications is hereby incorporated by reference in its entirety.

The invention relates to a method and system for alerting a truck driver.

DESCRIPTION OF THE PRIOR ART

In present days, more and more Advanced Driver Assistance Systems (ADAS systems) are introduced in motor vehicles. These so-called ADAS systems comprise scanning sensors, scanning the environment of the vehicle, and a computer control system for making decisions on intervening in and/or supporting the driver actions. The system further comprises actuators like braking and steering and preferably a communication means for informing the driver on the status of the system and/or providing warning signals in case of hazardous traffic condition also referred to as Human Machine Interface (HMI). These ADAS systems focus on road safety and warn the driver in case of a dangerous situation involving other road users or other risk of damage to vehicle and/or environment. The way drivers are alerted is also subject to improvements.

A new trend for collision warning is to project instrument panel data on the windscreen of the vehicle. This keeps focus to the outside of the vehicle. For example, it is known to project a braking signal light on the windscreen, in case of a collision warning. In U.S. Pat. No. 8,049,609 a system is disclosed that projects an array of light sources provided on a surface of an instrument panel of a vehicle opposed to a windshield, displaying target information.

In DE 102011121847 a digital projector is described for projecting laser light on a windscreen and possibly side windows to provide a 'HUD' Head Up Display. However, there is high need to further develop and optimize these systems. One of the many challenges is a practical implementation of a projection device, that is compact and does not provide hindrance for the persons/driver that occupy the cabin. For this problem, no suitable solutions are known thus far. This invention envisages a solution in this respect.

SUMMARY OF THE INVENTION

It is aimed to provide a projection system for projecting signal data on a windscreen or side screens of a motor vehicle cabin. The system comprises a light source arranged for emitting a beam and a housing, to be configured at an elevated position in the cabin. The housing comprising a digital mirror device, the digital mirror device arranged pattern the beam of the light source to project an image on at least a front and side window portion of the cabin. Part of the housing is shaped with a reflective surface that is optically inverse to the cabin window geometry, so that, when the digital mirror device projects a single image on the optical surface, it is imaged on the windscreen and at least one of side windows.

BRIEF DESCRIPTION OF THE DRAWINGS

The invention will be further elucidated in the figures.

DETAILED DESCRIPTION

Figure 1:
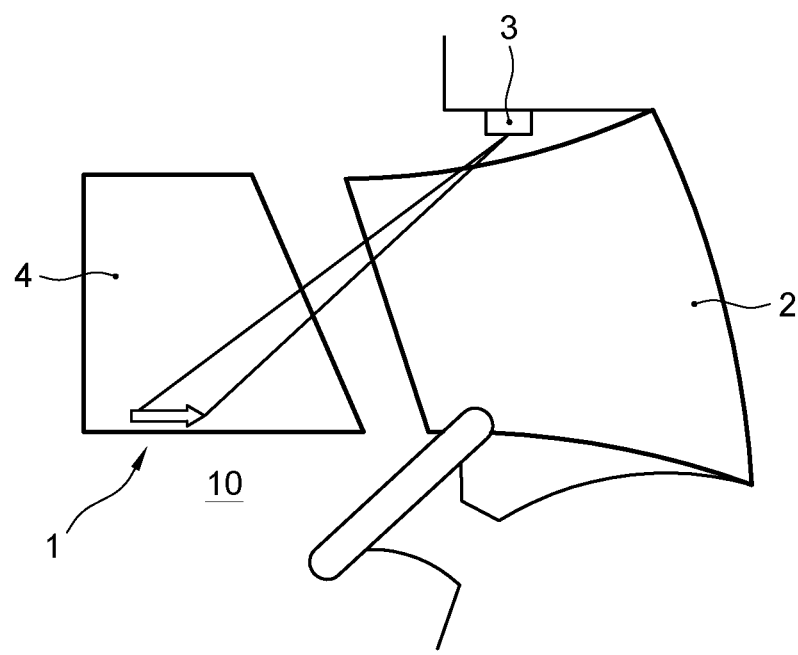
FIG. 1 shows a schematic illustration of a cabin with projected signal data on a windscreen or side screens of a motor vehicle cabin.

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

The term "controller" is used in a conventional way to signify any structural hardware or software arrangement having a capability of executing program logic in order to provide a certain basic function. A skilled person is typically aware of how to operate or implement a circuit in the context of the description, with processor elements elucidated here below.

Moreover a central vehicle management system may be provided with program logic to control the engine transmission and brake of the truck, in order to accelerate or decelerate the truck, to regulate the vehicles behavior in dependence of an initial response of the driver to a projection system. The tracking controller program logic may comprise feedback control circuitry, that is based on sensor inputs that measure an inter distance and relative velocity between the truck and an object that is detected, from an ultrasonic sensor, a radar, lidar, camera image or combinations thereof.

The term "program logic" is used in a conventional way to signify the operating instructions, which may be embodied in hard- or software structures, that control a circuit to the designated functional behavior.

The term "signal line" is used in a conventional way to signify an information exchanged via signal transmission, which may be in the form of coded signals, in analogue or digital fashion by any conventional communication device, where it is not excluded that other signal lines are available, but merely to signify that a certain connectivity is available. This may also indicate indirect connectivity, that is, a signal line may be provided by indirect signaling, for example wireless signaling and/or via another functional device.

The processor may be a dedicated processor for performing in accordance with the present system or may be a general-purpose processor wherein only one of many functions operate for performing in accordance with the present system. The processor may operate utilizing a program portion, multiple program segments, or may be a hardware device utilizing a dedicated or multi-purpose integrated circuit. Any type of processor may be used such as a dedicated or shared one. The processor may include microcontrollers, central processing units (CPUs), graphical processing units (GPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims.

Figure 2:
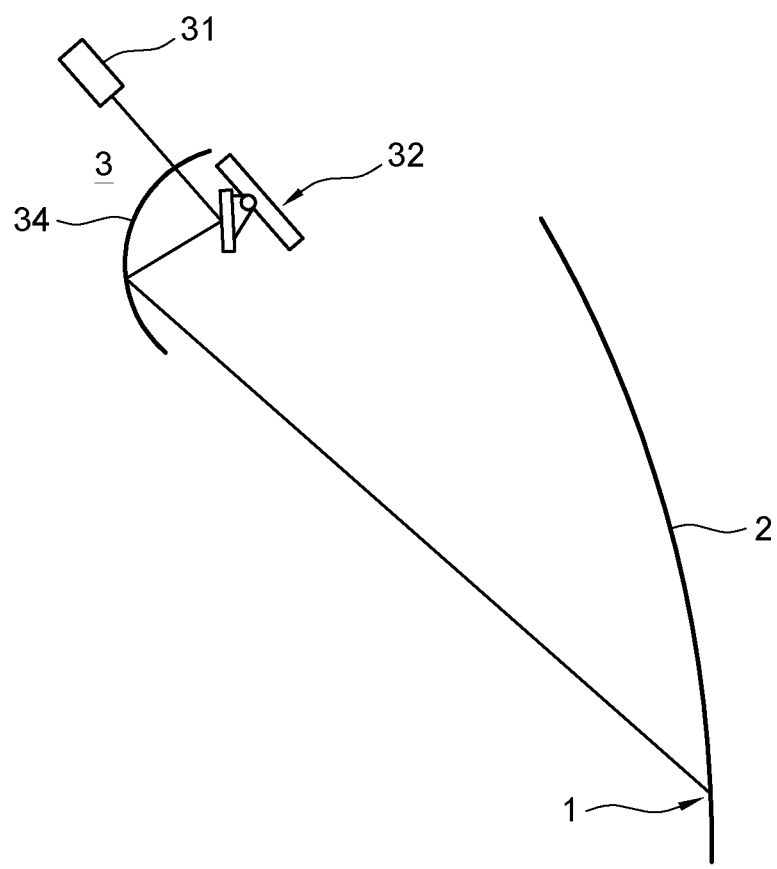
FIG. 2 shows a further illustration of the embodiment of FIG. 1.

FIG. 1 shows a generic setup of a signal system 3 in a driver cabin 10 of a motor vehicle. The system is configured for projecting signal data 1 on side screen 4 of the motor vehicle cabin 10 or on windscreen 2. In more detail, FIG. 2 shows how projection device, by means of a digital mirror device, having high frequency tiltable mirror elements, scribes a signal line 2 of a light source 31, by the mirror device 32 and via optic 34, on the windscreen 2. The projection optic 34, which may be reflective or refractive, is an optically inverse of the cabin window geometry, so that, when the digital mirror device projects a single image on the optical surface 34, it is imaged on a designated part of the cabin windows, in the exemplary case windscreen 2.

Figure 3:
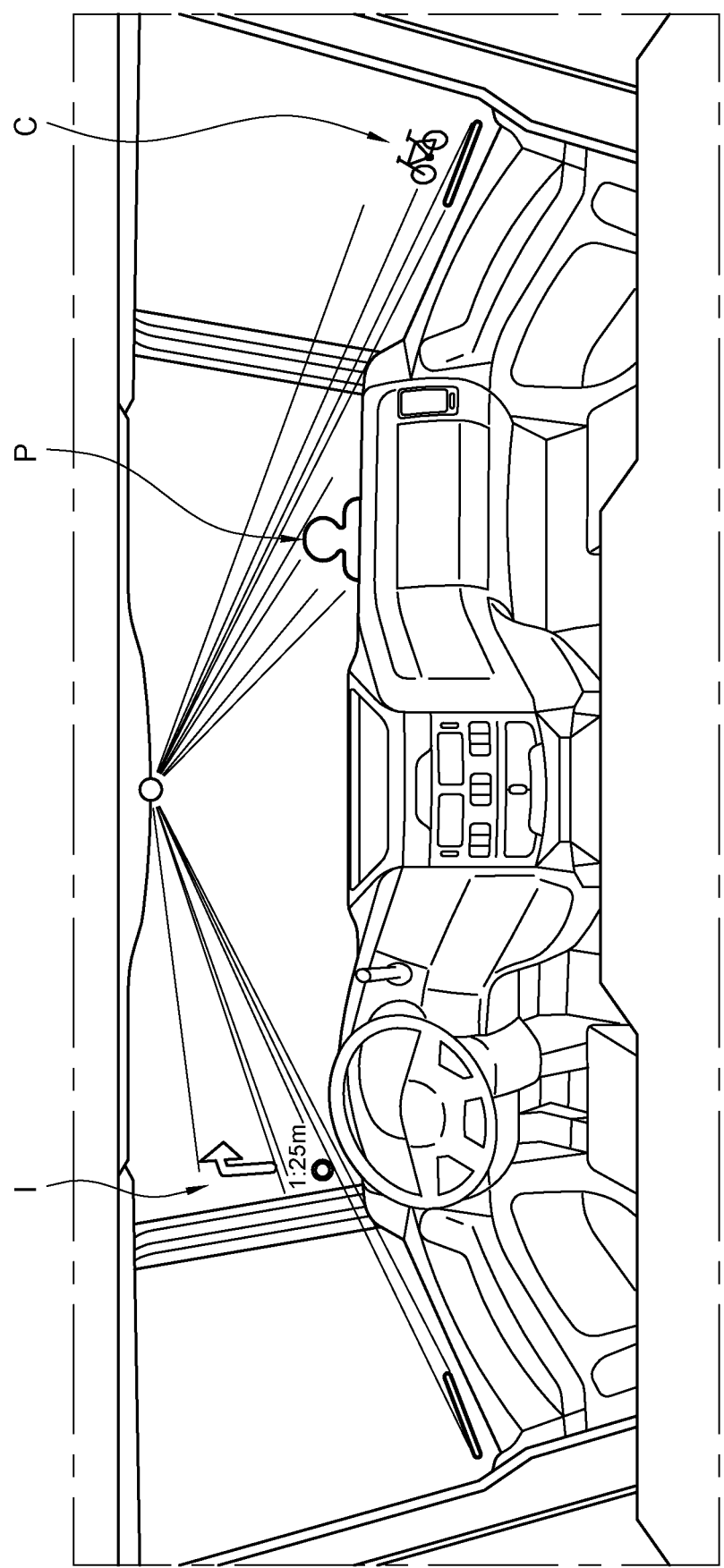
FIG. 3 shows a detailed illustration of another embodiment of the invention.

In FIG. 3 further illustrative examples are shown, for instance, that a pedestrian P is in the blind spot area in front of the truck or a cyclist C is detected in the blind spot area besides the truck. Pedestrian P or cyclist C may be tracked by a tracking controller, arranged to identify objects to be tracked in the perimeter of the truck, in particular, the truck cabin 10. A signal controller is coupled to the tracking controller and activates projection system (e.g. of the type of FIG. 1) to project a signal light indicative of said tracked objects (P, C). Additionally, signal data I is shown, indicating conventionally routing indications and vehicle information. Advantageously, the signal light is substantially centered along a virtual line of sight from the driver towards the identified object to direct the drivers attention to the real objects, instead of a warning panel. For a truck driver this has the advantage that in the perception of the driver a direct view and virtual view in a vehicle's blind spot outside the line of sight, can be merged by projecting the signal lights for visible and blind spot objects on the windscreen over a visibility range, seen from the drivers perspective of about 180 degrees along a perimeter of the windscreen and side window. Thus, not only an alert is given for visible objects, but especially for objects that are not visible. In this respect a virtual line of sight from the driver towards the identified object provides a direction in which a tracked object is located relative to the driver, and light sources centered along this line of sight are activated signalling the tracked object.

Figure 4:
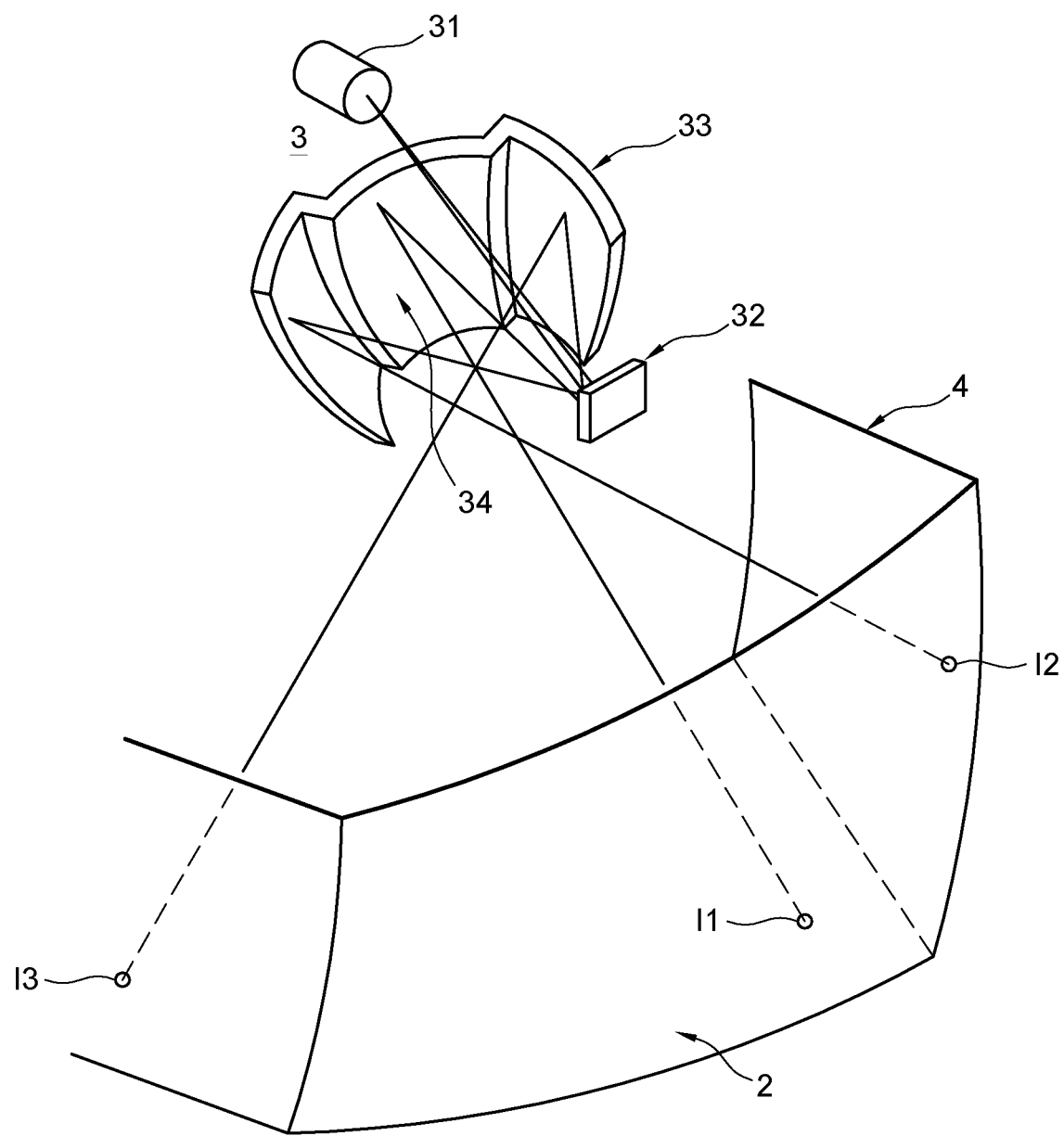
FIG. 4 shows a schematic cross sectional view of the embodiment of FIG. 3.

FIG. 4 shows a detailed illustration of another embodiment of the invention, wherein a projection system 3 is shown in more detail. The projection system 3 comprises a light source 31 arranged for emitting a light beam. Typically a powerful laser is used, in connection with a digital mirror device or mems device 32, arranged in a housing, to be configured at an elevated position in the cabin (See FIG. 1). The digital mirror device 32 is arranged to pattern the beam of the light source 31 to project an image I1, I2, I3 on at least a windscreen 2 or side window portions 4 of the cabin. According to an aspect of the invention, part of the housing 33 is shaped with a reflective surface 34 that is optically inverse to the cabin window geometry. When the digital mirror device 32 projects a single image on the optical surface 34, an image I1, I2, I3 is created on the windscreen 2 and at least one of side windows 4.

Figure 5:
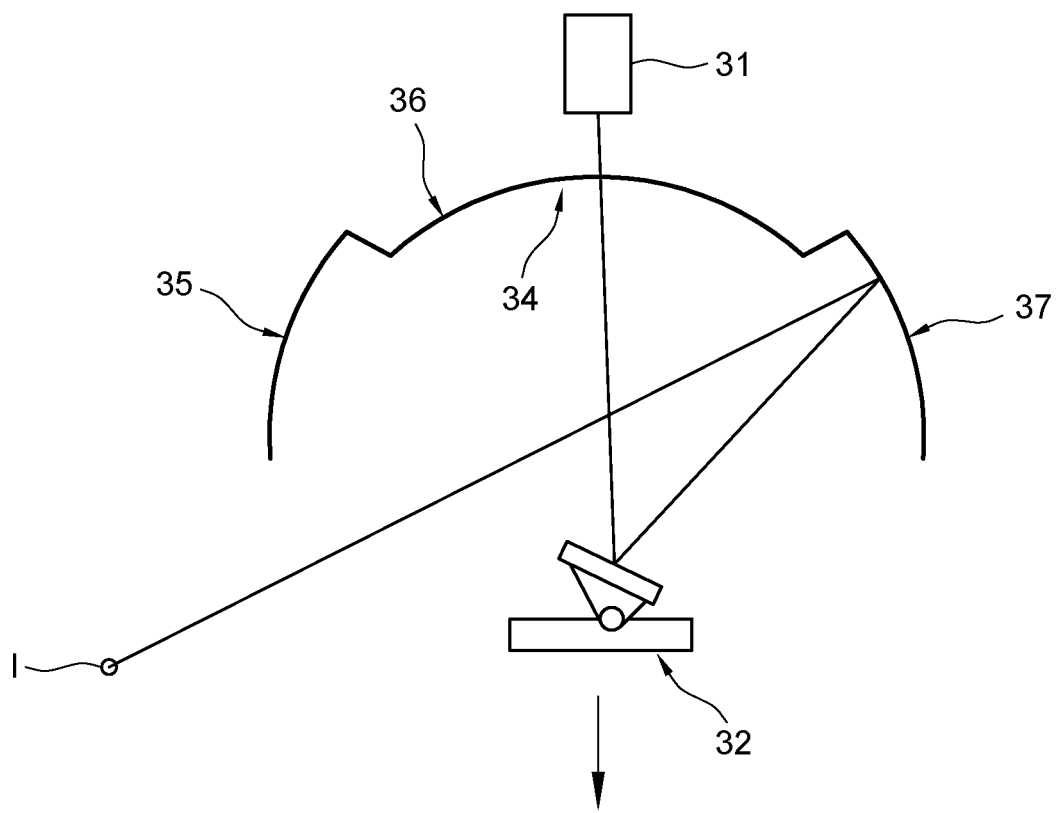
FIG. 5 shows a further embodiment of the invention.

FIG. 5 shows a schematic cross sectional view of the reflective housing 33 of FIG. 3, wherein it is shown that the reflective surface 34 is formed by a panel of disjunct mirror faces 35, 36, 37, wherein each of the mirror faces 35, 36, 37 has an aspheric (freeform) curvature suitable for projecting a split part of an image, projected by the digital mirror device 32, to a respective front I or side window of the cabin. The digital mirror device operates for example on micromirrors that oscillate with high frequency, so that a beam is projected on respective parts of the mirror faces 35, 36, 37 and imaged on an image I in forward or side direction. The faces 35, 36, 37 of the panel are angled with respect to each other, so that both side windows are projected from a single object image formed by the digital mirror device 32.

Figure 6:
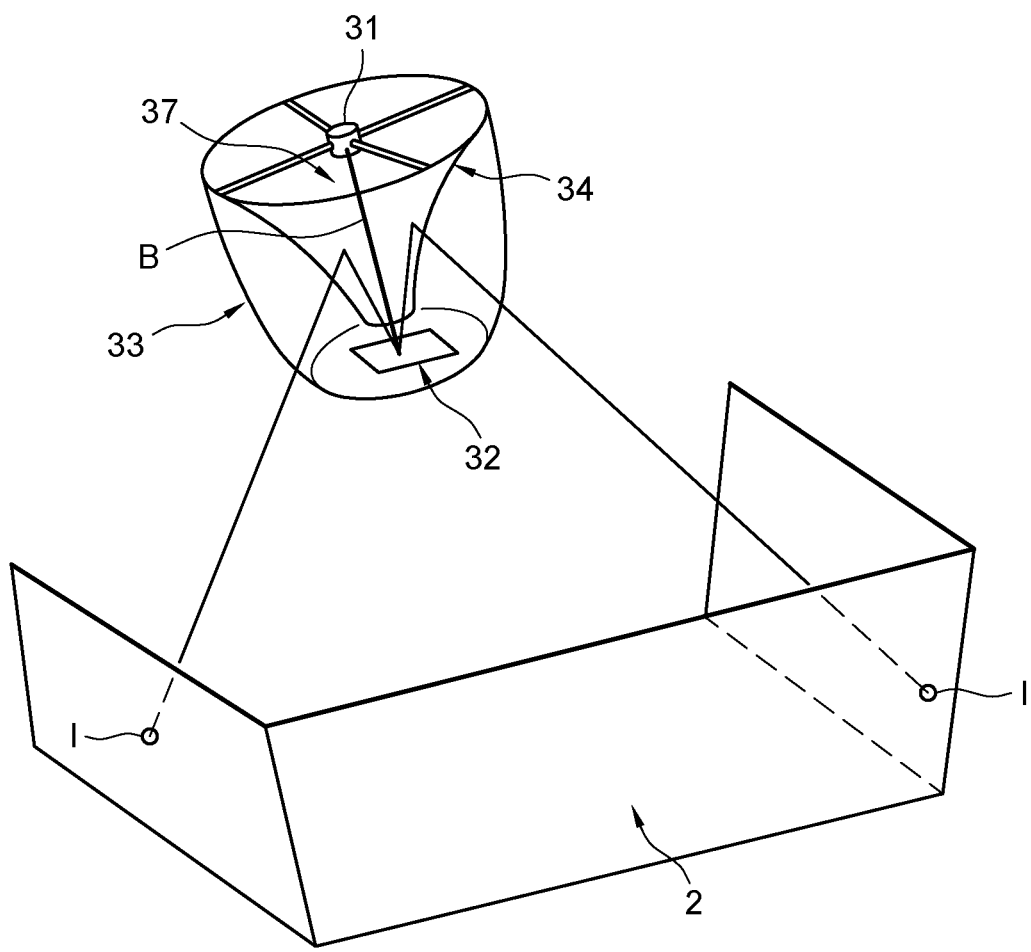
FIG. 6 shows a schematic cross sectional view of the embodiment of FIG. 5.
Figure 7:
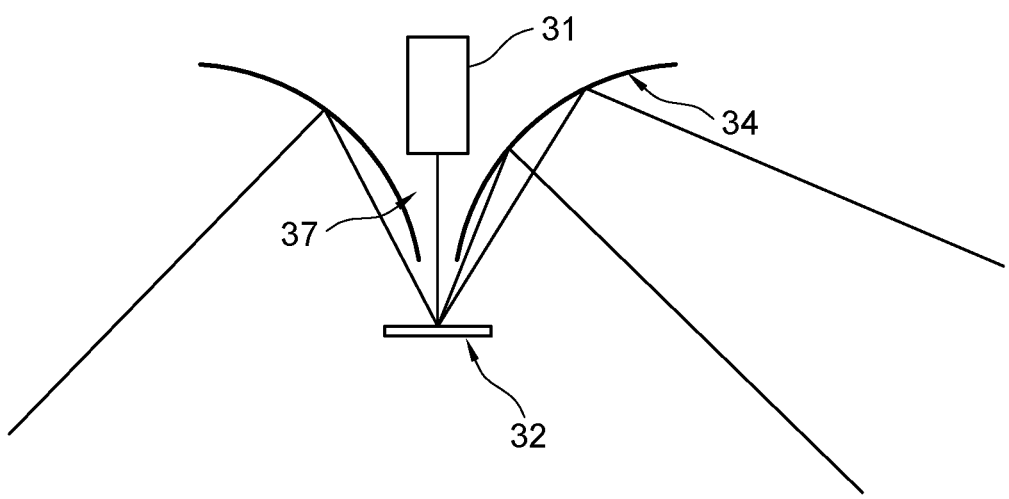
FIG. 7 shows another embodiment of the invention.

FIG. 6 shows a further embodiment of the invention. Similarly FIG. 7 shows a schematic cross sectional view of the embodiment of FIG. 6. In this embodiment a housing 33 is formed around a beam path 37 of the optical beam B. The beam path 37 is directed to a digital mirror device 32, situated at the bottom of the housing 33. The digital mirror device 32 is back reflects the image beam to said panel of disjunct mirror faces 34 provided in the housing 33. The mirror face 34 has a curvature suitable for projecting a split part of an image I, projected by the digital mirror device 32, to a respective front 2 window or side window. The housing may be partly transparent, to provide a cover for the mirror face 34.

FURTHER EMBODIMENTS

In an embodiment, the image data may be provided from cameras or as scan data from 2D or 3D scanners. Furthermore, optionally, tracked objects may be calculated or validated, e.g. by Kalman type filtering, from other sensors, e.g. in areas where the scanner cannot look. E.g. the reference position can be further measured by conventional means, e.g. on-board parking sensors. These additional sensors can also be used to optimize the driver interaction; e.g. by smoothen the accelerations or steering action according to preset constraints.

The application of the signal system is not limited for signaling passengers or bikers that are withdrawn from direct visual sight. To the contrary, the signal system can be applied to signal a variety of objects and events of interest, that are detected in the vicinity of the truck. These can be in a non-limitative way barriers, posts, (still standing) vehicles etc. in particular, to function as a collision warning system, to prevent the vehicle from colliding during maneuvering. Furthermore, it is not necessary that the optic is able to cover a full half sphere of the cabin, but the optic may be arranged to cover right or left semi half spheres, by providing multiple projection systems that are mounted at separate locations at elevated positions in the cabin. In these separate projection systems, each one may be provided with a designated reflective surface that is optically inverse to a complementary part of the cabin window geometry, so that, when the digital mirror device projects a single image on the optical surface, it is imaged on a part of the cabin geometry, in particular, windscreen and at least one of side windows.

The invention claimed is:

1. A projection system for projecting signal data on a windscreen or side screens of a motor vehicle cabin, said system comprising:
a light source arranged for emitting a beam;
a housing, to be configured at an elevated position in the cabin, the housing comprising a digital mirror device, the digital mirror device arranged to pattern the beam of the light source to project an image on at least a front and side window portion of the cabin;
wherein part of the housing is shaped with a reflective surface that is optically inverse to the cabin window geometry, so that, when the digital mirror device projects a single image on the optical surface, it is imaged on the windscreen and at least one of side windows.

2. The projection system according to claim 1, wherein the reflective surface is formed by a panel of disjunct mirror faces, wherein each of the mirror faces has a curvature suitable for projecting a split part of an image, projected by the digital mirror device, to a respective front or side window.

3. The projection system according to claim 2, wherein the faces of the panel form an angle, so that both side windows are projected from a single object image formed by the digital mirror device.

4. The projection system according to claim 2, wherein the housing is formed around a beam path of the optical beam, said beam path directed to a digital mirror device, and said digital mirror device back reflecting to said panel of disjunct mirror faces on said housing, wherein each of the mirror face has a curvature suitable for projecting a split part of an image, projected by the digital mirror device, to a respective front or side window.

\* \* \* \* \*